United States Patent
Bales

(10) Patent No.: US 6,552,460 B2
(45) Date of Patent: Apr. 22, 2003

(54) BRUSHLESS ELECTRO-MECHANICAL MACHINE

(75) Inventor: John E. Bales, Brush Prairie, WA (US)

(73) Assignee: Motile, Inc., Portland, OR (US)

( * ) Notice: Subject to any disclaimer, the term of this patent is extended or adjusted under 35 U.S.C. 154(b) by 0 days.

(21) Appl. No.: 09/803,007

(22) Filed: Mar. 8, 2001

(65) Prior Publication Data

US 2002/0125781 A1 Sep. 12, 2002

(51) Int. Cl.$^7$ .................. H02K 1/22; H02K 21/12
(52) U.S. Cl. ..................... 310/156.35; 310/268
(58) Field of Search ................ 310/156.35, 156.32, 310/112, 261, 266, 267, 268, 12, 13, 14, 254, 258, 259

(56) References Cited

U.S. PATENT DOCUMENTS

| | | | | |
|---|---|---|---|---|
| 2,567,422 A | * | 9/1951 | Camp | 101/322 |
| 2,994,023 A | * | 7/1961 | Devol | 264/272.21 |
| 3,700,942 A | * | 10/1972 | Alth | 310/164 |
| 4,103,197 A | | 7/1978 | Ikegami et al. | 310/267 |
| 4,190,779 A | | 2/1980 | Schaeffer | 310/12 |
| 4,315,171 A | | 2/1982 | Schaeffer | 310/49 R |
| 4,547,713 A | | 10/1985 | Langley et al. | 318/254 |
| 4,605,874 A | | 8/1986 | Whiteley | 318/268 |
| 4,639,626 A | * | 1/1987 | McGee | 310/155 |
| 4,654,551 A | | 3/1987 | Farr | 310/112 |
| 4,866,321 A | * | 9/1989 | Blanchard et al. | 310/112 |
| 5,044,897 A | | 9/1991 | Dorman | 417/423.7 |
| 5,079,467 A | | 1/1992 | Dorman | 310/156 |
| 5,148,069 A | | 9/1992 | Nonaka et al. | 310/68 R |
| 5,179,307 A | | 1/1993 | Porter | 310/68 B |
| 5,334,898 A | | 8/1994 | Skybyk | 310/298 |
| 5,677,605 A | | 10/1997 | Cambier et al. | 318/254 |

(List continued on next page.)

FOREIGN PATENT DOCUMENTS

| | | |
|---|---|---|
| GB | 2 139 430 A | 5/1983 |
| JP | 61035145 | 2/1986 |
| JP | 61214763 | 9/1986 |
| JP | 61221563 | 10/1986 |
| JP | 63121460 | 5/1988 |
| JP | 4087543 | 3/1992 |

OTHER PUBLICATIONS

Cho, Chahee Peter, Doctor of Philosophy, Dissertation—University of New Hampshire, "Analysis and Design Considerations of a High Power Density, Dual Air Gap, Axial–Field, Brushless, Permanent Magnet Motor," 1995 (entire hardbound book submitted).

Hanselman, Duane C., "Brushless Permanent–Magnet Motor Design," University of Maine, Orono, Maine, McGraw–Hill, Inc., 1994, pp. 1–192.

Prina, Steven R., "Considerations in the Design of Brushless DC Motors," Parker Hannifin Corp, Parker Motor Design Center, Portsmouth, New Hampshire, 1992.

Primary Examiner—Dang Dinh Le
(74) Attorney, Agent, or Firm—Loudermilk & Associates

(57) ABSTRACT

An electromotive machine having a stator element and a rotor element, the stator element including at least one set of four toroidally shaped electromagnetic members, the electromagnetic members arranged along an arc a predetermined distance apart defining a stator arc length. Each of the members has a slot, and the rotor element includes a disc adapted to pass through the slots. The disc contains a plurality of permanent magnet members spaced side by side about a periphery thereof and arranged so as to have alternating north-south polarities. These permanent magnet members are sized and spaced such that within the stator arc length the ratio of stator members to permanent magnet members is about four to six. The electromagnetic members are energized in a four phase push-pull fashion to create high torque and smooth operation.

20 Claims, 6 Drawing Sheets

U.S. PATENT DOCUMENTS

| | | | |
|---|---|---|---|
| 5,696,419 A | * 12/1997 | Rakestraw et al. | 290/43 |
| 5,744,896 A | 4/1998 | Kessinger, Jr. et al. | 310/268 |
| 5,786,645 A | * 7/1998 | Obidniak | 310/254 |
| 5,798,591 A | 8/1998 | Lillington et al. | 310/164 |
| 5,798,594 A | 8/1998 | Radovsky | 310/180 |
| 5,854,521 A | * 12/1998 | Nolle | 310/12 |
| 6,046,523 A | 4/2000 | Bailey | 310/156 |
| 6,049,197 A | 4/2000 | Caamaño | 322/89 |
| 6,071,093 A | 6/2000 | Hart | 471/424.2 |

* cited by examiner

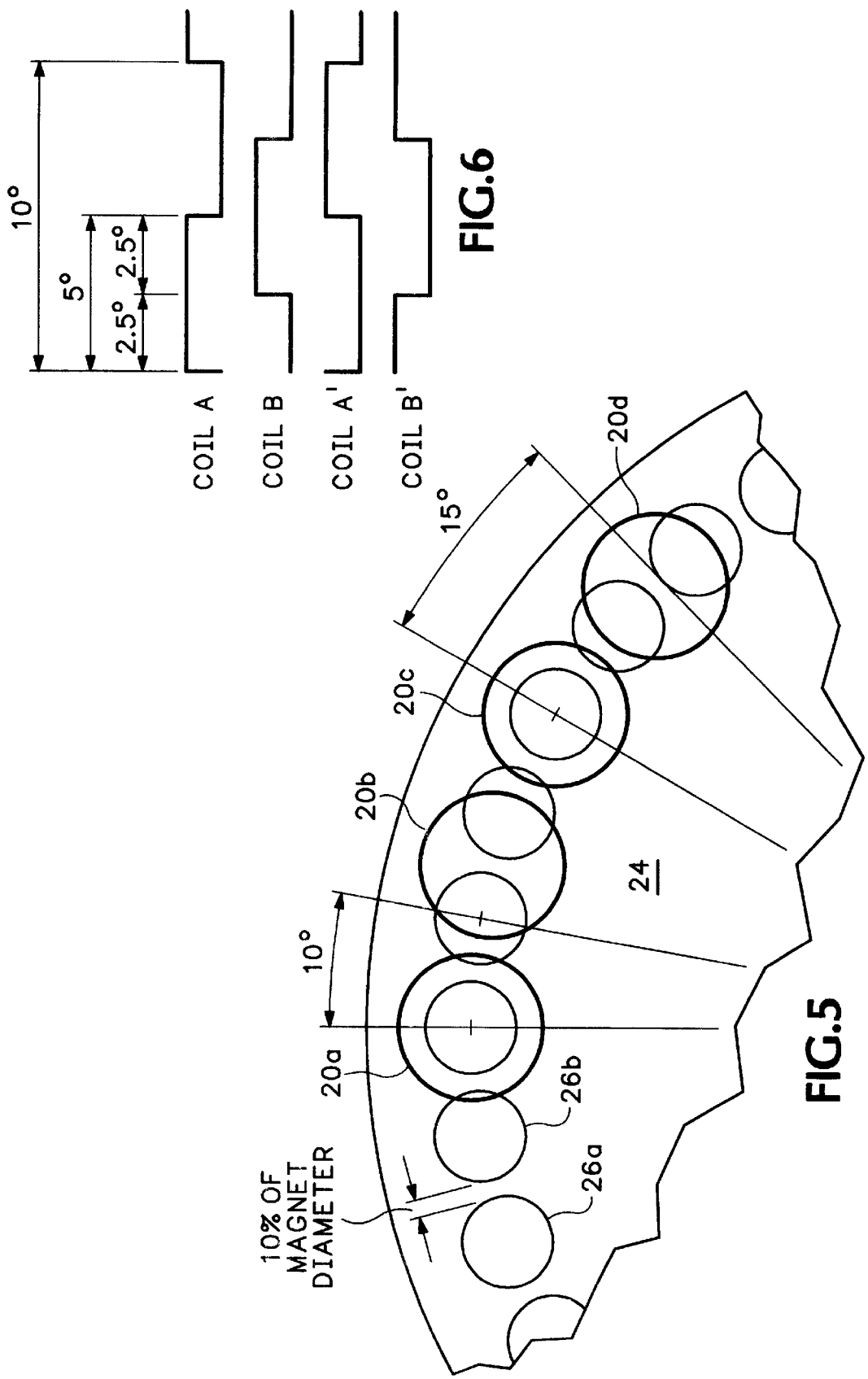

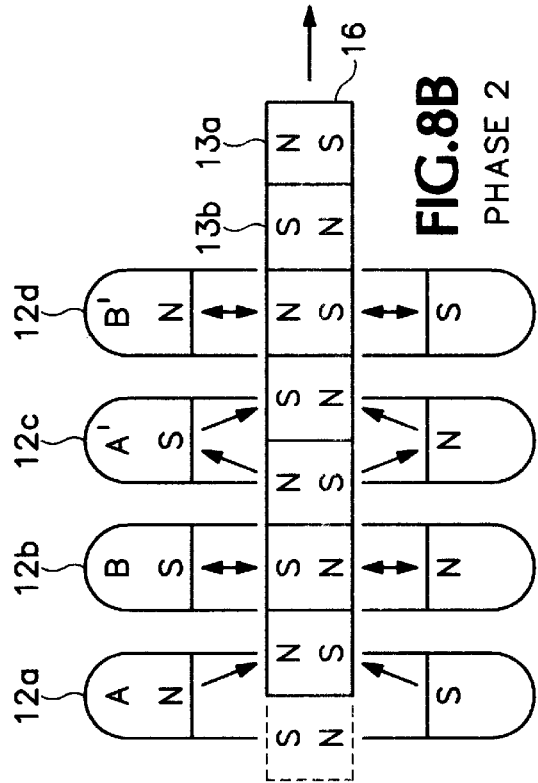
FIG. 8A PHASE 1
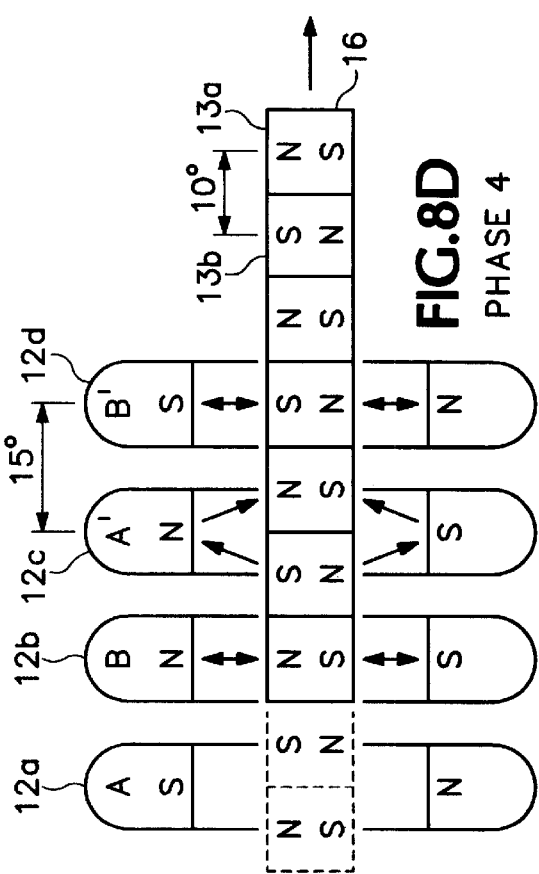
FIG. 8B PHASE 2
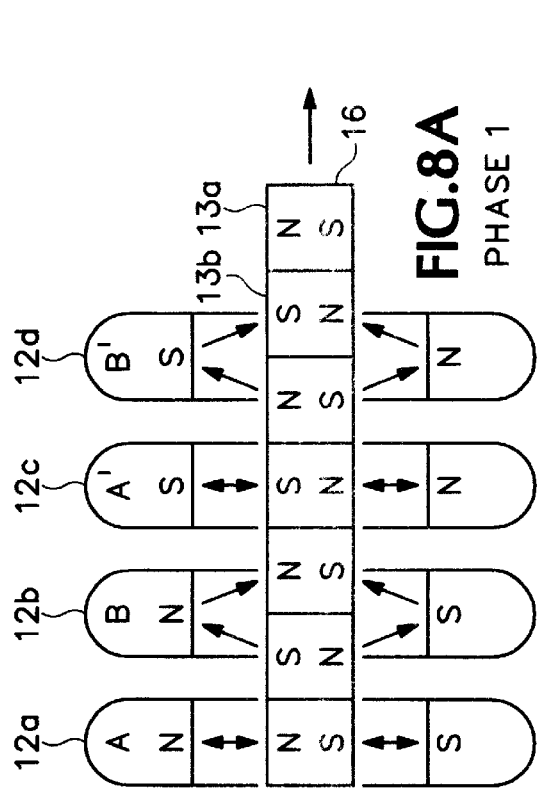
FIG. 8C PHASE 3
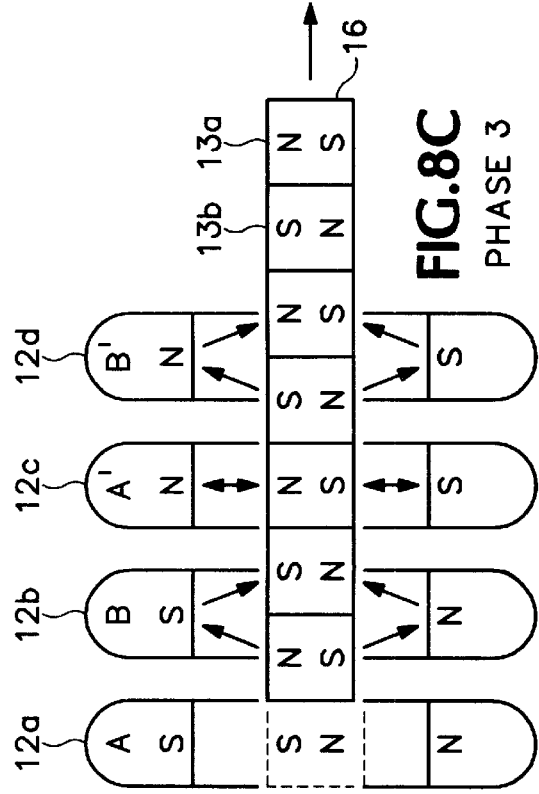
FIG. 8D PHASE 4

BRUSHLESS ELECTRO-MECHANICAL MACHINE

BACKGROUND OF THE INVENTION

The following invention relates to a brushless electromechanical machine for converting electrical energy into mechanical motion and vice-versa. More specifically, the invention relates to an electric motor/generator having self-starting capabilities, high torque and increased efficiency.

Electric motors employing brushes are characterized by low efficiency and require elaborate starter mechanisms. Recently, a type of brushless motor has been developed which employs an electromagnet having a stator comprised of a plurality of toroidal pole pieces. The pole pieces each have a narrow gap to permit the passage of a disk shaped rotor. The rotor includes a plurality of permanent magnet members spaced about the periphery of the disk. As the permanent magnet members pass through the gap in the stator poles, the magnetic circuit is completed. With appropriate switching circuitry, this combination can be made to function as a brushless electric motor. An example of such construction is shown in the Porter U.S. Pat. No. 5,179,307.

In the Porter motor, the permanent magnets on the rotor are widely spaced apart. The rotor is a disk having permanent magnet members situated about its periphery and spaced 36° apart. The driving circuitry is triggered by combinations of light emitting diodes and photosensitive transistors arranged on opposite sides of the rotor disk. Apertures in the rotor disk permit light from and LED to fall on a photosensitive transistor at appropriate points in the rotation of the rotor disk. This causes the driving current to cause current to flow in the coil.

A problem with the motor of the '307 patent is that the permanent magnets are spaced too far apart about the periphery of the rotor disk for the machine to operate efficiently. This wide spacing of permanent magnet members would require a large mass rotor operating as a flywheel with enough energy stored in the rotor to provide considerable rotational momentum. A large mass rotor, however, would be impossible to start without some type of auxiliary starter mechanism. Additionally, this motor cannot easily reverse its direction.

BRIEF SUMMARY OF THE INVENTION

The present invention provides a construction for an electromotive machine which can be either an electric motor or a generator. The electromotive machine includes a stator element and a rotor element where the stator element includes at least one set of four toroidally shaped electromagnetic members where the electromagnetic members are arranged spaced apart along an arc to define a stator arc length. Each of the electromagnetic members includes a slot and a rotor element comprising a disk adapted to pass through the aligned slots of the electromagnetic members. The rotor contains a plurality of permanent magnet members spaced side-by-side about a periphery of the disk and arranged so as to have alternating north/south polarities. The permanent magnet members are sized and spaced such that within the stator arc length, the ratio of stator members to permanent magnet members is about 4 to 6.

Although the electromotive machine of the invention will work with one set of four toroidal electromagnets, a second set may be positioned symmetrically along a circular arc defined by the first set. Additional sets of four toroidal electromagnetic members may be used if desired.

The machine includes at least one motor drive electronics module for energizing the toroidal electromagnetic members with current according to a predetermined sequence. The sequence is triggered by Hall effect sensors placed adjacent the electromagnetic members along the arc. The Hall effect sensors sense changes in the magnetic field and provides trigger signals to the electronics module so that the electronics module can energize the electromagnetic members in a predetermined sequence. Since the ratio of electromagnet stator members to permanent magnets on the outer periphery of the disk is about 4 to 6, the toroidal electromagnets are operated in push-pull fashion in which switching occurs when a pair of magnets passes the centerline of an electromagnetic member.

The machine may also be operated in reverse as a generator using the rotor as a mechanical input device. In this configuration current induced in the coils by the turning of the rotor charges a battery. In an automobile, for example, the machine may operate first as a starter motor and then switch over to an alternator.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 5 is a partial plan schematic view of the electromechanical machine of FIG. 1.

FIG. 6 is a timing diagram illustrating the switching characteristics of the electronic drive module of FIG. 3.

FIGS. 8A–8D represents a schematic view of the toroidal electromagnetic members and the permanent magnet members illustrating the four-phase switching characteristics of the electronics driver module of FIG. 3.

DETAILED DESCRIPTION OF THE PREFERRED EMBODIMENT

Figure 1:
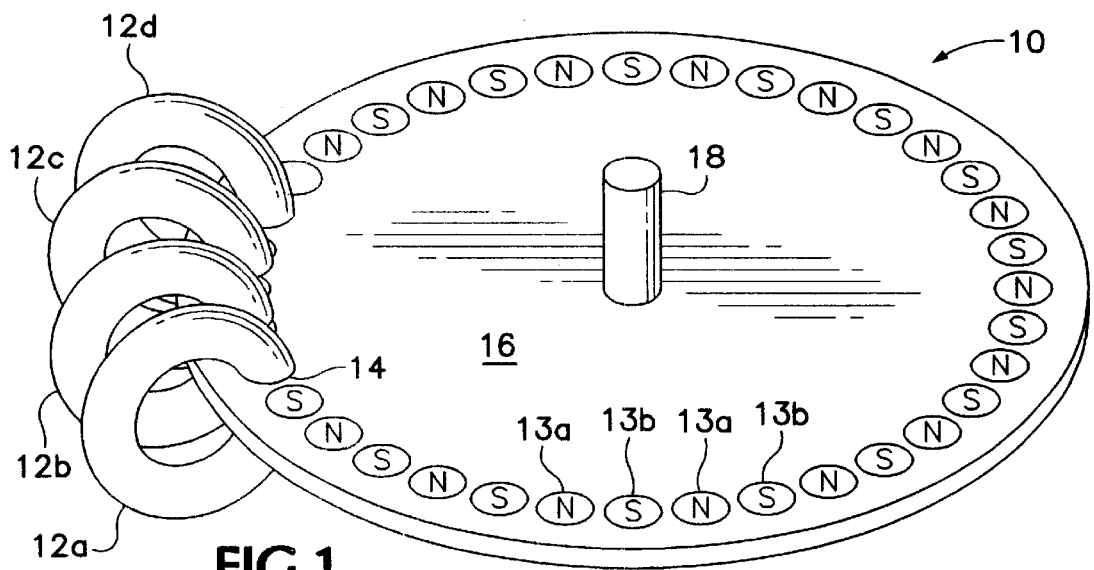
FIG. 1 is a perspective schematic view of the electromechanical machine of the present invention.

An electromechanical machine 10 is shown schematically in FIG. 1. The machine 10 includes a plurality of toroidally shaped electromagnets 12. There are four such electromagnets 12a, 12b, 12c and 12d. The electromagnets 12a–d are arranged along an arc having a predetermined length. Each of the electromagnets is toroidally shaped and each has a gap 14 (refer to FIG. 2A). The gaps 14 are aligned which permits the outer edge of a wheel or disk 16 to pass through them. The disk 16 has an output shaft 18 which may be coupled to any suitable device such as a fan or a tub for a washing machine (not shown). The output shaft could also be coupled to some source of rotational energy such as a drive shaft. In this configuration, the motor is initially used as a starter motor and then switches into a generator or alternator mode.

The disk includes a plurality of permanent magnet members 13a, 13b which are arranged in alternate north-south polarity. The magnets 13a, b are sized and spaced so that within the stator arc length the ratio of toroid electromagnets 12a–d to permanent magnets 13a, b is always about 4 to 6. The permanent magnets are closely spaced, having spaces between each adjacent magnet that does not exceed 10% of the diameter of the uniformly sizes magnets 13a, b.

Figure 2:
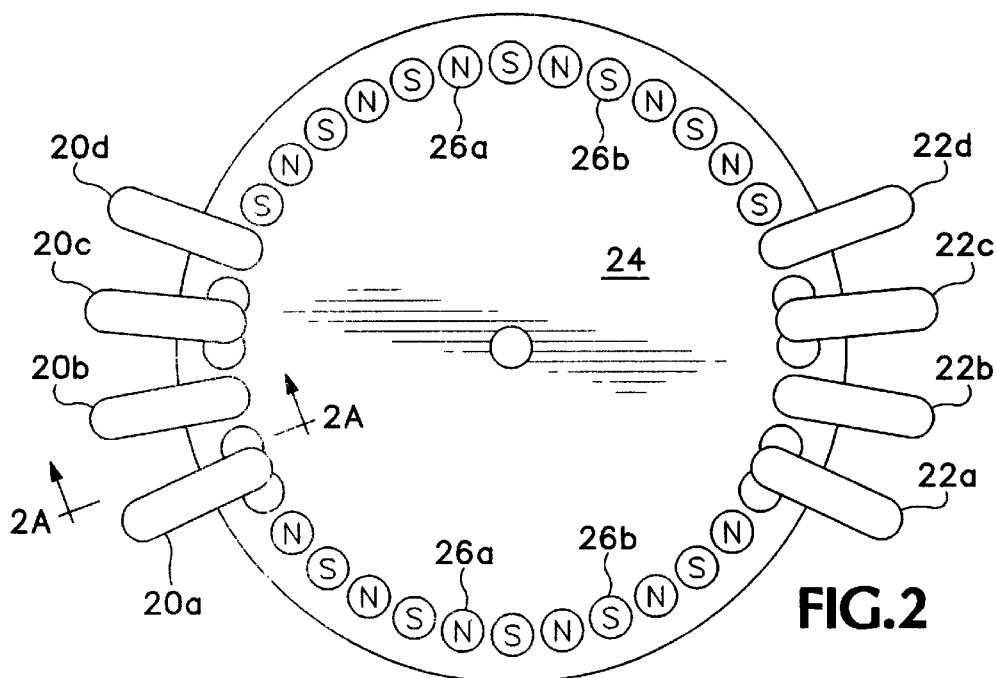
FIG. 2 is a top view of the electromechanical machine of the present invention employing two sets of electromagnetic members.
Figure 2A:
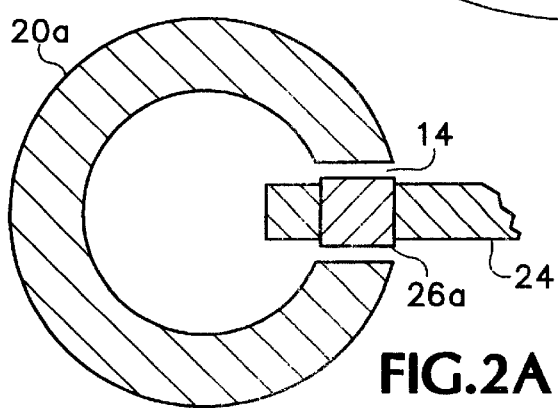
FIG. 2A is a side cutaway view of FIG. 2 taken along line 2—2.

Referring to FIG. 2, if desired, two groups of electromagnet members 20 and 22, respectively, may be used. Each of the sets 20 and 22 contains at least four (4) toroidal electromagnet members 22a–d and 20a–d respectively. Further, if desired, more sets of electromagnet members may be used depending upon the type of application desired. Each of the electromagnetic members in a set contains a slot and the slots are aligned along an arc allowing the flywheel 24 to pass through the slots. As in the example of FIG. 1, the flywheel 24 includes a plurality of permanent magnet members 26 having alternating north-south polarities about the periphery of the flywheel 24 that are in all respects the same as magnets 13a, 13b.

The electromechanical machine of the present invention may be configured to operate either as a motor or as a generator. For example, when acting as a motor or a motor/starter, the electromagnets 12a–d are electronically switched in polarity to attract and then repel the appropriate permanent magnets 13a, b in the flywheel. This applies a rotational force to the flywheel and spins the output shaft 18. Since there are no mechanical gears needed, the starting action is silent. Conventional automotive starter motors, however, are noisy. Once the engine is running, the machine can be converted to a generator by decoupling the driving electronics module. The permanent magnets 13a, b moving past the electromagnets 12a–d with the driving circuitry now switched off can be used to generate electrical power.

Toroidal cores are used for the electromagnets in this machine since they are the most efficient transformer core configuration. Toroidal electromagnets are self-shielding since most of the flux lines are contained within the core. In addition, the flux lines are essentially uniform over the entire length of the magnetic path. The slot 14 that is formed in each of the toroidal electromagnetic members would normally cause a decrease in flux density. However, the action of the moving permanent magnet members keeps the gap filled with permanent magnet material and thus maintains the field integrity within the core.

Figure 3:
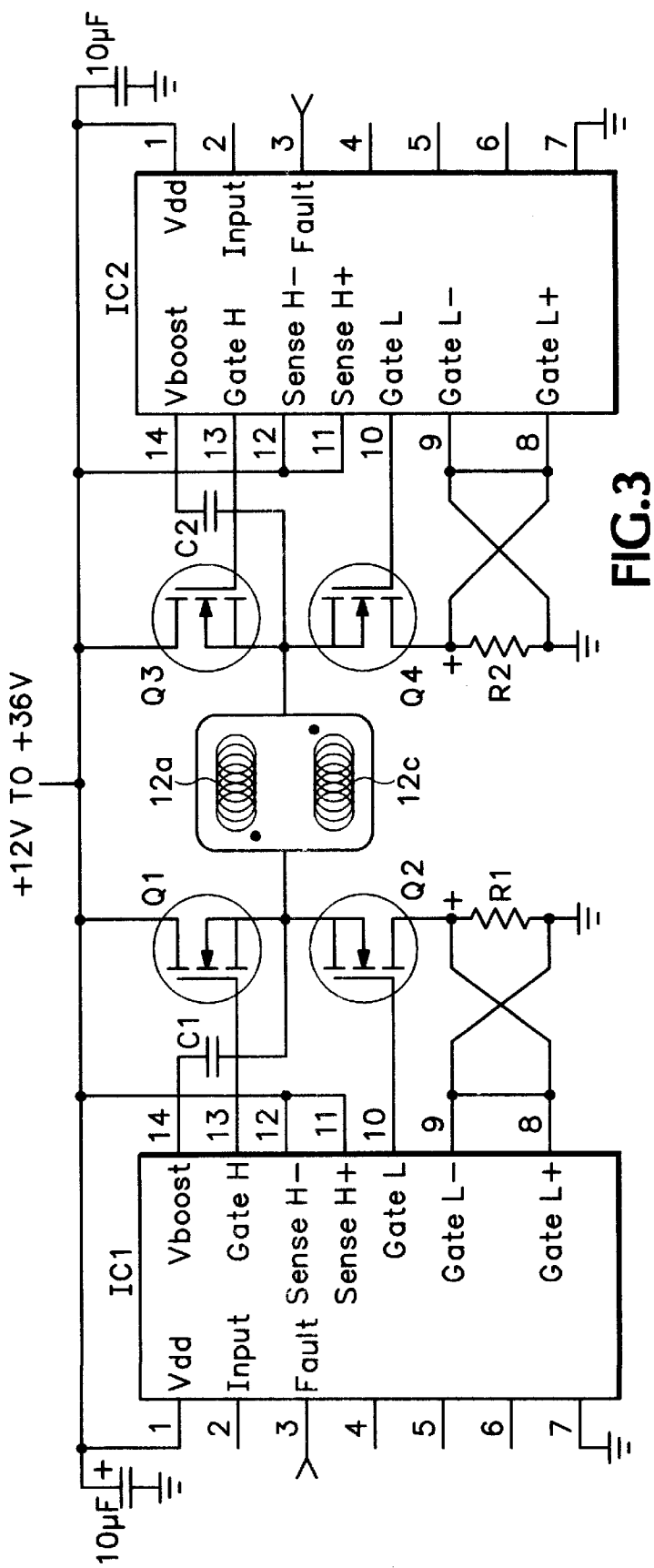
FIG. 3 is a schematic diagram of a drive module for use when the electromechanical machine is being used as an electric motor.
Figure 4:
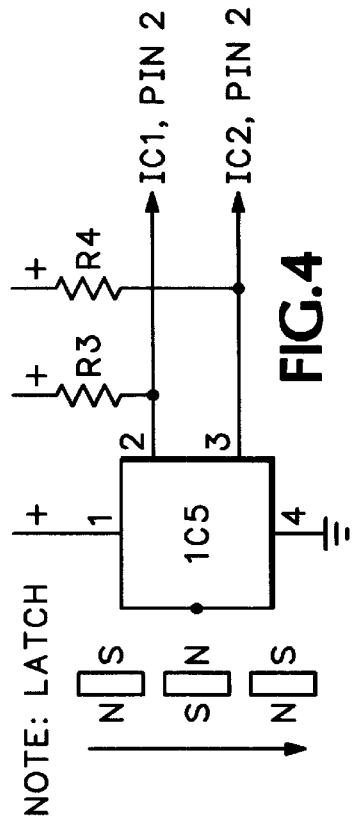
FIG. 4 is a schematic diagram of a Hall effect sensor used in connection with the electronic drive module of FIG. 3.

Referring to FIG. 3, a pair of integrated circuits IC1 and IC2 are coupled to two electromagnet members consisting of electromagnets 12a and 12c. It will be appreciated that an identical electronics module would be used to drive electromagnets 12b and 12d. The ICs, IC1 and IC2, have output gates coupled to transistors Q1, Q2, Q3 and Q4 respectively. IC1 and IC2 are half bridge MOSFET drivers which are triggered by Hall effect sensor IC5, (refer to FIG. 4). The Hall effect sensor IC5 has its outputs coupled to the inputs of IC1 and IC2, respectively. Output line IC5, pin 2 is coupled to the input line at pin 2 of IC1. Similarly, output line IC5, pin 3 is coupled to input line 2 of IC2. There is another Hall effect sensor (not shown) for electromagnets 12b and 12d which operates the same way but which is positioned so as to generate its signal at a phase angle which lags the signal from IC5. The result is that electromagnetic member pairs are energized 180° out of phase with each other. This is illustrated by the timing diagram of FIG. 6.

FIG. 6 shows a four-phase timing diagram that repeats for every 10° of rotation of the rotor 16. The magnets 13a, b are spaced 10° apart while the electromagnetic members 12a–d are spaced 15° apart. The timing relationship between the magnets and the coils is shown best in FIGS. 8A–8D. As will be appreciated by those of skill in the art, the illustrated relationship defines four repeating commutation intervals.

The arrows in FIG. 8 for each phase indicate the lines of attraction and/or repulsion between the permanent magnets and the coils based upon the polarity of the energizing current from the driver module pairs of IC's of FIG. 3. FIG. 8 illustrates schematically the waveform of FIG. 6. IC1 and IC2 generate driver currents 180° out of phase so that when coil 12a is high, 12c is low and vice versa. Another driver module pair of IC's (not shown) does the same thing with coils 12b, 12d but out of phase with respect to toroidal coils 12a, 12c by 5°. The Hall sensors are placed along the stator in advance of the rotor and are spaced apart by 5° in order to trigger their respective IC's at a phase angle difference of 5°. The result is a very smooth rotor drive made possible by the sizing and spacing of the magnets so that the ratio of coils to magnets within the arc length of the electromagnet members 12a–12d is always 4 to 6. Thus, a pair of alternate north-south pole magnets are experiencing opposite polarity fields when they are centered within the gaps of alternate electromagnets 12a, 12c, while north-south pairs of magnets, each halfway within the slots of the other pair of electromagnets 12b, 12d, are experiencing the switching of the polarity of current through those electromagnets 12b, d.

Figure 7:
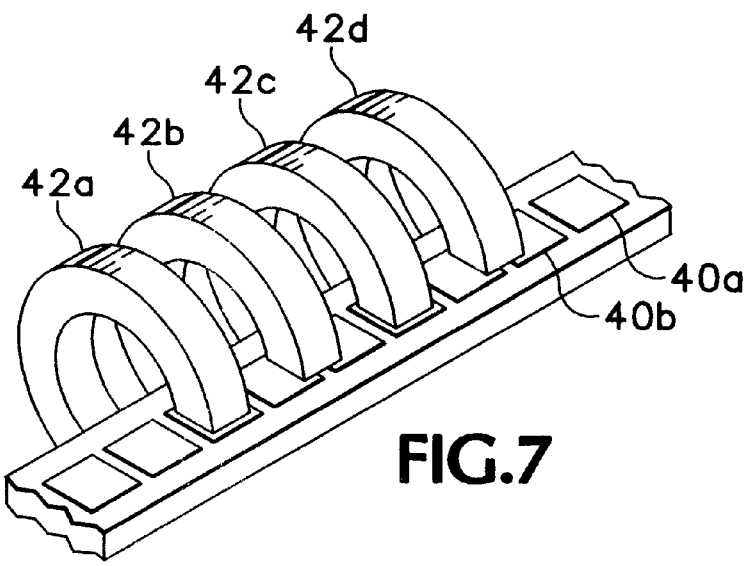
FIG. 7 is a partial perspective view of the electromechanical machine of the present invention configured as a linear actuator.

Referring to FIG. 7 the machine of the present invention may be operated as a linear actuator. In this embodiment the magnets may be of a rectangular shape. In this case, the stator arc length is measured along a straight line and it should be understood that the term stator arc length need have no particular shape as it may be used with stator/rotor configurations of differing types. In addition, the magnets need have no particular shape to be effective. As long as the ratio of electromagnetic members to permanent magnets is about 4 to 6 within the arc length occupied by the stator coils, the invention will operate as desired.

Figure 9:
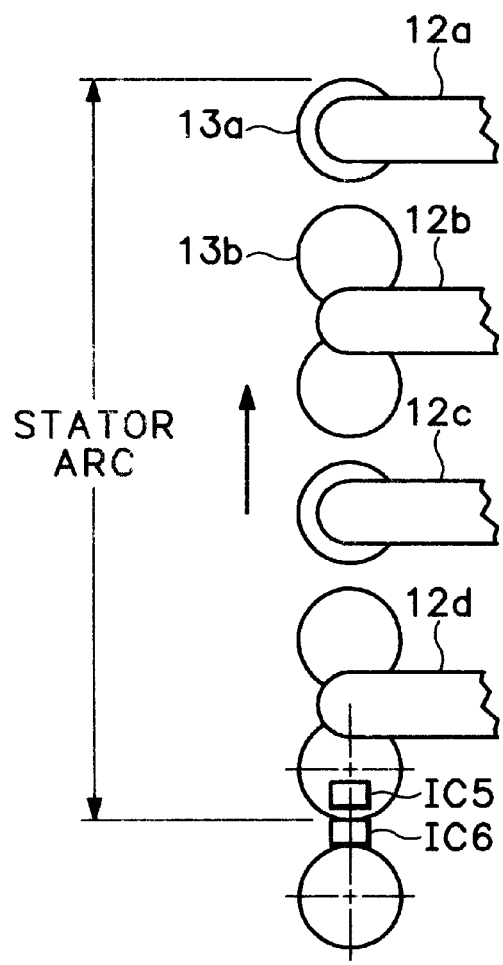
FIG. 9 is a partial top view of an electromotive machine of the invention.

Referring to FIG. 9, the Hall sensors IC5 and IC6 are spaced apart by 5° radially so that trigger signals will be generated in the proper phase with each other. The Hall sensors are affixed to a stator housing (not shown). It can be appreciated from FIG. 9 that the term "stator arc length" includes an arc that is slightly longer than the length between each end of the 4 electromagnets 12a–d and includes areas where the fields generated by those electromagnetic members influence the permanent magnets 13a, b. In FIG. 9, this area is indicated by the dashed lines. Although the arc in FIG. 9 has been shown as substantially a straight line, it is to be understood that it may represent either a linear device or a circular arc.

Figure 10:
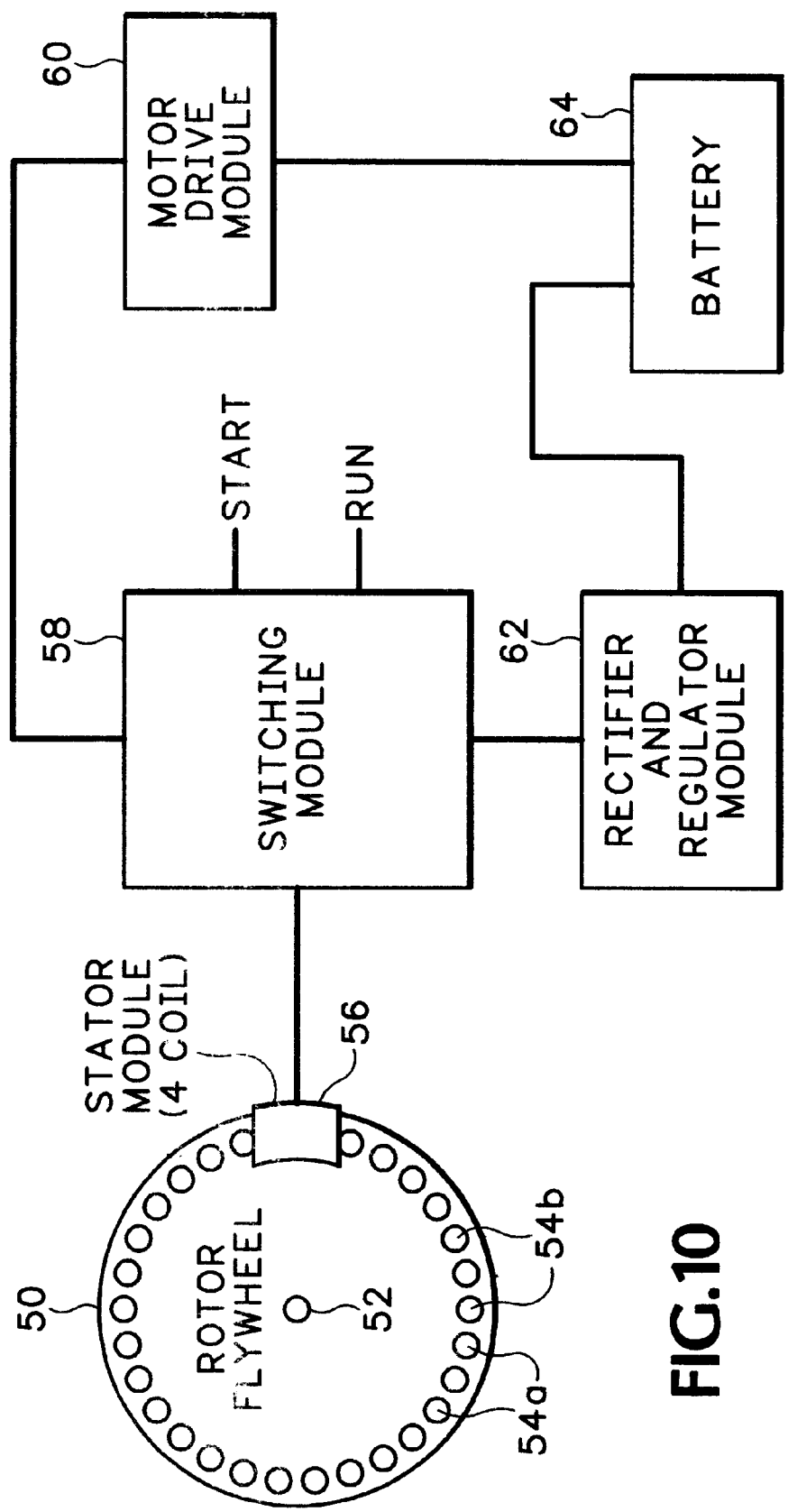
FIG. 10 is a schematic diagram of a circuit employing the invention as a combination starter motor and alternator.

Referring to FIG. 10, a rotor or flywheel 50 is coupled to a shaft 52 which may in turn be coupled to the drivetrain of an automobile (not shown). Permanent magnets 54a (North polarity) and 54b (South polarity) are situated about the periphery of the rotor 50. A stator module 56 is situated adjacent the rotor 50 and includes a set of four toroidal electromagnetic members having substantially the same configuration as shown in FIG. 1. A switching module 58 switches between a circuit that accepts an input from a motor drive module 60 and one that provides an output to a rectifier and regulator module 62. The regulator module 62 charges a battery 64.

Signals on input lines labeled "start" and "run" respectively control the function of the switching module 58. In the start mode a circuit like the circuit of FIG. 3 is turned on in the switching module. Once the motor (not shown) has been turned on, a signal is provided to the "run" line turning off the circuit of FIG. 3 and allowing current from the stator module 56 to flow directly to the rectifier and regulator module 62.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An electromotive machine comprising a stator element and a rotor element,
    wherein the stator element comprises at least one set of four toroidally shaped electromagnetic members, the electromagnetic members arranged along an arc a predetermined distance apart defining a stator arc length, each of the electromagnetic members having a slot,
    wherein the rotor element comprises a disc adapted to pass through the slots of the electromagnetic members, the disc containing a plurality of permanent magnet members spaced side by side about a periphery thereof and arranged so as to have alternating north-south polarities, the permanent magnet members being sized and spaced such that within the stator arc length the ratio of electromagnetic members to permanent magnet members is four to six, and
    wherein when operating as a motor the electromotive machine is self-starting.

2. The electromotive machine of claim 1, further including at least a second set of four toroidally shaped electromagnetic members positioned symmetrically with respect to the first set along the arc.

3. The electromotive machine of claim 1, further including at least one motor drive electronics module for energizing the set of electromagnetic members with current according to a predetermined sequence.

4. The electromotive machine of claim 3, further including Hall effect sensors situated adjacent selective ones of the electromagnetic members and providing trigger signals to the electronics module to enable the electronics module to execute the predetermined sequence.

5. The electromotive machine of claim 1 wherein each of the permanent magnet members are spaced not to exceed 10° apart as measured between radial lines extending from a center of the disc through a center of each permanent magnet member.

6. The electromotive machine of claim 1, further including a drive circuit for providing drive current to the electromagnetic members thereby causing the rotor member to rotate, and a switching module for turning off the drive circuit thereby allowing the electromagnet members to provide current to charge a battery.

7. An electromotive machine comprising:
    (a) a stator assembly including at least one electromagnet module, the electromagnet module comprising at least four electromagnetic members, each of the electromagnetic members having a slot, the electromagnetic members arranged side by side wherein the slots are aligned with each other; and
    (b) a rotor assembly comprising a rotary member having a periphery, the rotary member including a plurality of permanent magnet members arranged along the periphery side by side in alternating north-south polarities;
    wherein the electromagnetic members are spaced not to exceed 15° apart as measured between radial lines extending from a center of the rotary member through a center of each electromagnetic member, and wherein the permanent magnet members are spaced not to exceed 10° apart as measured between radial lines extending from a center of the rotary member through a center of each permanent magnet member.

8. The electromotive machine of claim 7, further including a driver circuit coupled to the electromagnet module for energizing the electromagnetic members in an alternating polarity sequence.

9. The electromotive machine of claim 8, further including Hall effect sensors spaced adjacent to the electromagnetic members for providing trigger signals to the driver circuit.

10. The electromotive machine of claim 7 wherein the stator assembly includes at least a pair of electromagnet modules.

11. The electromotive machine of claim 10 wherein the rotary member comprises a disk or wheel.

12. The electromotive machine of claim 11 wherein the permanent magnet members are disc-shaped.

13. The electromotive machine of claim 12 wherein each permanent magnet member has a diameter, and a spacing between adjacent permanent magnet members does not exceed 10% of the diameter.

14. The electromotive machine of claim 7 wherein the stator and rotor assemblies are configured as a linear actuator.

15. The electromotive machine of claim 7, further including a switching module for switching the driver circuit off and for coupling an output of the stator assembly to a rectifier circuit for charging a battery.

16. A self-starting electromotor, comprising:
    (a) a stator assembly comprising a plurality of electromagnetic members, each of the electromagnetic members having a core providing a magnetic path and including a slot, wherein the electromagnetic members are arranged side by side, wherein the slots are aligned with each other; and
    (b) a rotor assembly comprising a rotary member having a periphery, the rotary member including a plurality of permanent magnet members arranged along the periphery side by side in alternating north-south polarities;
    wherein the electromagnetic members and permanent magnet members are arranged so that for every two electromagnetic members there are three permanent magnet members, wherein the electromagnetic members are selectively energized so that the electromotor is self starting.

17. The electromotor of claim 16, wherein the ratio of electromagnetic members to permanent magnet members is based on a relationship of four to six.

18. The electromotor of claim 16, further comprising Hall effect sensors, wherein the Hall effect sensors are positioned on the stator assembly and provide timing signals for controlling the selective energizing of the electromagnetic members.

19. The electromotor of claim 16, wherein the electromagnetic members are selectively energized so as to provide four repeating commutation intervals.

20. The electromotor of claim 16, wherein a control module controls the electromotor to operate as a motor in a first mode of operation and to operator as a generator in a second mode of operation.

* * * * *